Jan. 13, 1959 L. P. DOUGHERTY 2,868,088
APPARATUS FOR NOTCHING THE EDGES OF ADDRESSOGRAPH PLATES
Filed July 2, 1953 2 Sheets-Sheet 1

INVENTOR.
Leo P. Dougherty
BY Darby & Darby
ATTORNEYS

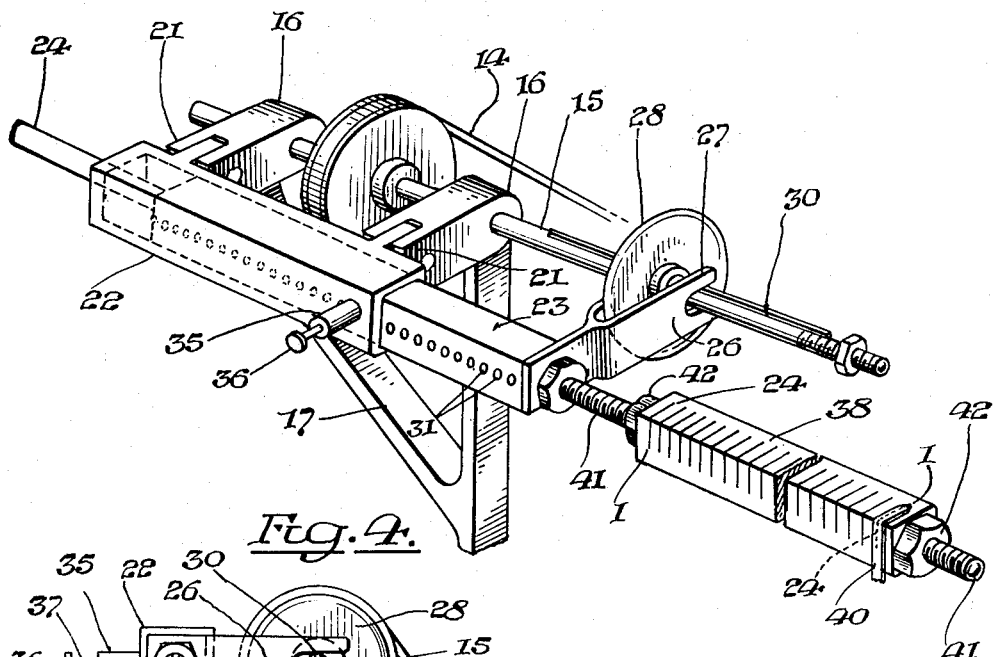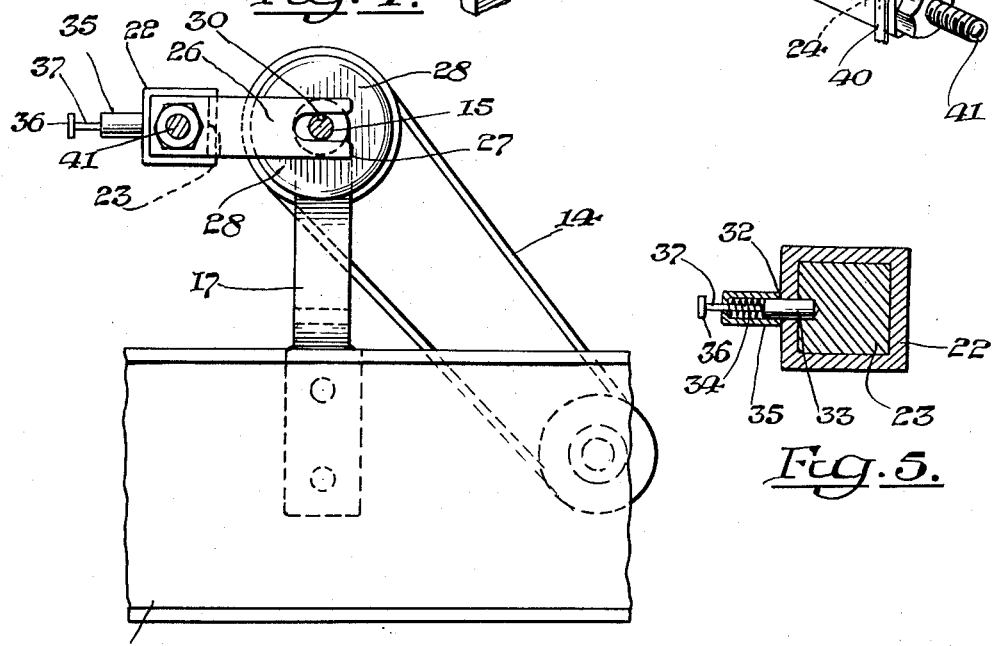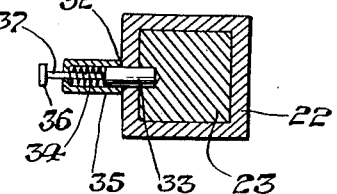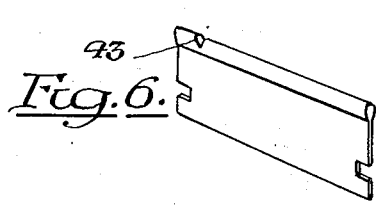

sts Patent Office 2,868,088
Patented Jan. 13, 1959

2,868,088

APPARATUS FOR NOTCHING THE EDGES OF ADDRESSOGRAPH PLATES

Leo P. Dougherty, New York, N. Y.

Application July 2, 1953, Serial No. 365,660

1 Claim. (Cl. 90—16)

The present invention relates to apparatus for notching the edges of addressograph plates, and particularly to apparatus of the type described wherein a single notching cutter is utilized and the cutter is axially adjustable along an arbor on which it is mounted.

In my co-pending application, Serial No. 333,781, filed January 28, 1953, now Patent No. 2,826,125, issued Mar. 11, 1958, there is disclosed a machine for notching addressograph plate edges. In the machine of that application, a plurality of cutters are spaced along an arbor, and a magazine carrying a stack of addressograph plates is moved beneath and in contact with the cutters to produce notches at desired points.

My present invention is an improvement over the structure disclosed in that application and provides means whereby a single cutter may be utilized, and addressograph plates stacked in a magazine may be moved in contact with the cutter to provide a single notch in corresponding locations on all plates, the cutter being movable along its arbor to select the location at which the single notch is to be made.

It is an object of the invention to provide apparatus for notching the edges of addressograph plates.

It is another object of the invention to provide such notching apparatus wherein a single notching cutter is employed and the cutter moved along a splined arbor in order to adjust the cutter to notch the addressograph plates at a desired location.

It is a further object of the invention to provide such a notching apparatus having means for definitely locating the notching cutter in any one of a plurality of possible notching positions and to indicate at which of the plurality of locations the cutter is situated at a particular moment.

Other objects and features of the invention will appear when the following description is considered in connection with the annexed drawings, in which Figure 1 is a top plan view of a machine in accordance with my invention, this view showing a portion of the machine of my prior application above referred to with the apparatus of my present invention mounted thereon;

Figure 3 is a perspective view showing the structure of the instant invention and its mounting on the machine of my prior application above-mentioned;

Figure 4 is a fragmentary vertical cross-section of the machine of Figures 1 and 2, the view being taken on the plane of the line 4—4 of Figure 2;

Figure 5 is a detail cross-sectional view of the means for indexing the indicator and cutter moving means, this view being taken on the plane of the line 5—5 of Figure 3; and Figure 6 is a perspective view of an addressograph plate showing a notch in one of the possible 24 locations thereon as it would be made by a single pass of a plate beneath and in contact with the notching cutter.

Figure 1:
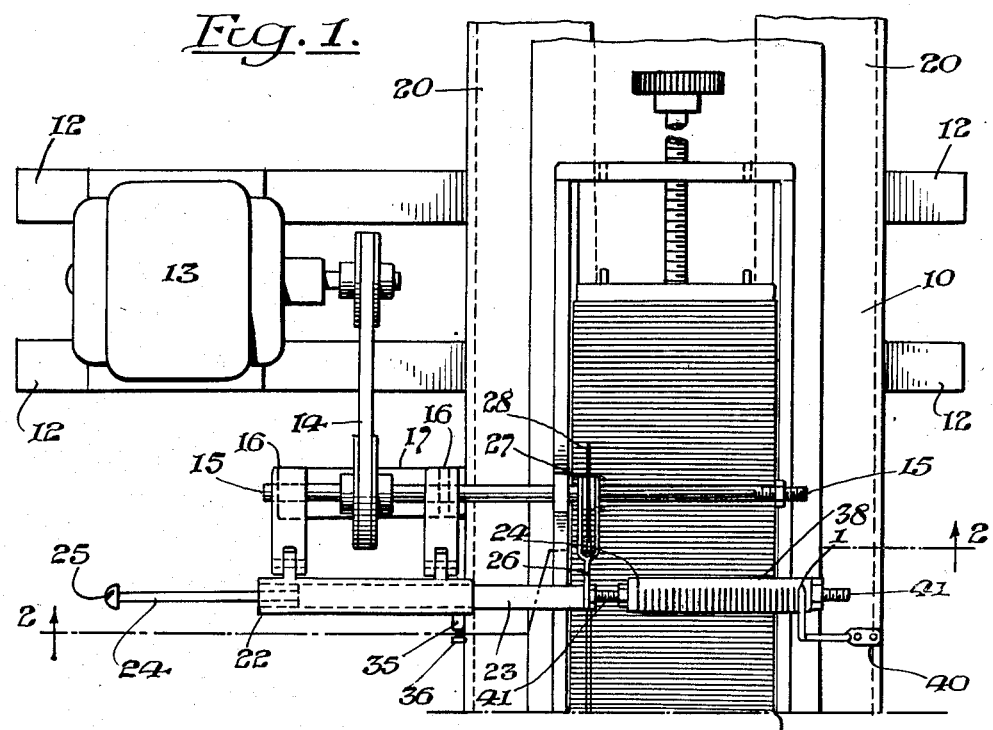
Figure 2:
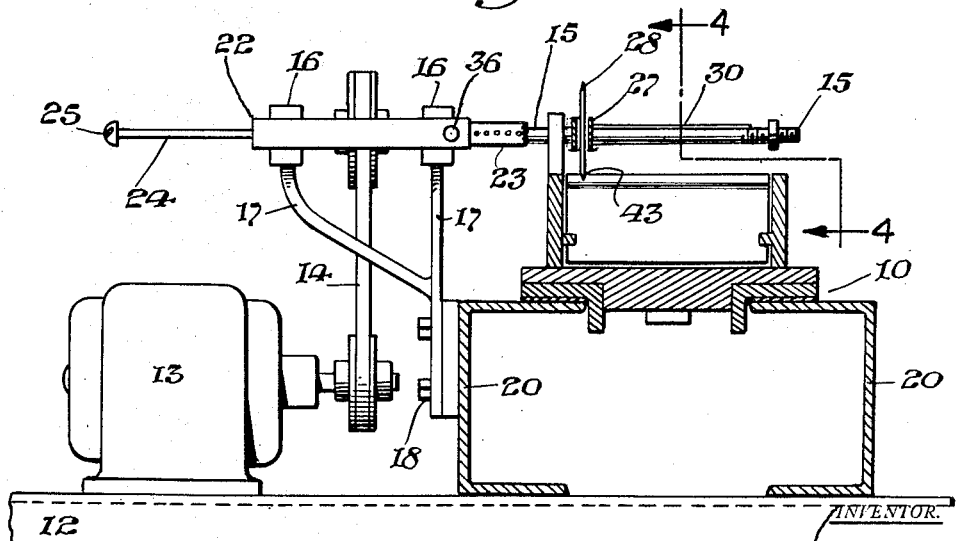
Figure 2 is a transverse vertical cross-sectional view of the machine of Figure 1, the view being taken on the planes of the line 2—2 of Figure 1.

Referring now to the drawings, there is shown at 10 a base on which a magazine 11 is mounted for longitudinal reciprocatory movement. Such movement may be produced by manual means or by motor drive, apparatus for procuring both being disclosed in my application above referred to. The base or table 10 is in turn mounted upon frame members 12 which extend to the side of the table 10 and support an electric motor 13. The motor 13 is connected by means of suitable pulleys and a belt 14 to an arbor 15 which arbor is supported in the bearings 16, the bearings being integral with or fixed to the upwardly extending arms 17 of a bracket 18 which bracket is fixed to one of the channels 20 on which the table 10 is mounted for reciprocation. All of the above structure is described in detail in the co-pending application above referred to.

The bearings 16 of the co-pending application have been modified in form in the present instance and extend outwardly horizontally forming extensions 21. Mounted on the extensions 21 is a sleeve 22, see Figures 3 and 5, which is rectangular in cross-section and which is closed at its left hand end. Slidably mounted within the sleeve 22 is a block 23 similar in cross-sectional shape to the shape of the tube 22 and having a snugly sliding fit therein. Fixed to the rod 23 at its left hand end, as seen in Figure 3, is a round rod 24 which extends through a circular opening in the closed left end of sleeve 22. Rod 24 terminates in a head 25 which serves as a stop and permits movement of the block 23 to the right to a desired extent only.

Fixed to the right hand end of the block 23 is a fork 26, each tine of which is bifurcated as is indicated at 27. The fork 26 is adapted to extend on either side of a cutter 28 which cutter is similar to that disclosed in my co-pending application and is slidably mounted on the arbor 15 while constrained to rotate with that arbor by means of the spline 30.

The square block 23 is provided with apertures 31 along one side thereof as is clearly seen in Figure 3, these apertures being equal in number to the desired location of notches in the addressograph plate and having their centers spaced apart the same distance as the space between the center line of adjacent notching positions.

The sleeve 22 is provided with a single aperture 32 adjacent its right hand edge and on the side corresponding to the side of sleeve 23 in which apertures 31 are placed. Through the aperture 32 a plunger 33 extends, this plunger being spring pressed inwardly by means of a spring 34 compressed between the plunger 33 and a small cylindrical housing 35 fixed to the outer surface of the sleeve 22. Plunger 33 is provided with a handle 36 connected to the plunger by means of a small rod 37 which rod extends through the housing 35. By means of the arrangement just above described, the inner block 23 may be placed and held in any one of a plurality of locations relative to the fixed outer sleeve 22, it being only necessary to manually retract the plunger 33 from the bore into which it extends to then move the block 23 to the new location and to then release the plunger which will then enter the bore corresponding to the new position and hold the block 23 in that new position.

Fixed to the block 23 at its right hand edge is an index member 38 which index is graduated to correspond with the apertures 31 in the block 23 and likewise to the various locations at which notches may be produced in addressograph plates. As shown in the present instance the graduations on the vertical side of the square index member 38 run from 1 to 24 reading from left to right and reading in the same direction the graduations on the top of the index member 38 run from 24 to 1. The index member 38 cooperates with a pointer 40, see Figure 1, which pointer may be fixed to any suitable portion of the stationary framework of the machine.

Preferably, and as is shown in Figure 3, the index member 38 is threaded upon a rod 41 and may be adjusted along that rod and locked in adjusted position by means of the lock nuts 42. Index member 38 is mounted upon the block 23 by threading the rod 41 into a threaded bore in member 23 although, of course, any other suitable means of mounting the index member upon the block 23 might be employed.

As will be clear from the above description, a plurality of addressograph plates may be placed in the magazine 11, the cutter 28 adjusted along the arbor 15 to any one of the possible 24 positions, and the stack of plates in the magazine then notched in the desired position by moving the magazine with respect to the cutter as that cutter rotates thereby cutting the triangular notches indicated at 43 in Figure 6. As has been indicated above, the adjustment of the cutter to the desired location is readily effected by releasing the block 23, moving it together with the index 38 to a desired location as indicated by the pointer 40 and then releasing the plunger 33 to lock the block 23 in that position. As the block 23 is moved the fork 26 causes the cutter 28 to move simultaneously therewith and assures that the cut will be made at the selected position.

While I have described preferred embodiments of my invention, it will be understood that many other modifications may be made without deviating from the principles thereof; therefore I wish to be limited, not by the foregoing description, but solely by the claim granted to me.

What is claimed is:

In a machine for notching the edges of addressograph plates, in combination, a horizontally extending arbor, means for rotating said arbor, means for mounting a cutter on said arbor to rotate therewith, said cutter being adjustable along said arbor, a holder for addressograph plates mounted for reciprocatory movement beneath and transversely of said arbor, said holder clamping addressograph plates with their edges in position to be operated upon by said cutter, means for adjusting the said cutter to a selected one of a plurality of fixed calibrated positions along said arbor, said adjusting means for said cutter comprising a sleeve of rectangular cross-section extending parallel to said arbor and fastened at one end to said arbor, a block of rectangular cross-section mounted for reciprocation in said sleeve, an end in said sleeve, said end having an aperture therein, a rod fixed to said block and extending through said aperture and a forked member affixed to and extending substantially perpendicular to said block and projecting horizontally to the position of said arbor with the tines thereof on opposite sides of said cutter, and means to retain said cutter in a selected one of said fixed positions.

References Cited in the file of this patent

UNITED STATES PATENTS

| | | |
|---|---|---|
| 155,103 | Nichols | Sept. 15, 1874 |
| 262,844 | Smith | Aug. 15, 1882 |
| 431,483 | Roe | July 1, 1890 |
| 469,543 | Cook | Feb. 23, 1892 |
| 1,269,413 | Finnigan | June 11, 1918 |
| 1,355,288 | Trout | Oct. 12, 1920 |
| 1,366,313 | Erickson | Jan. 18, 1921 |
| 1,366,783 | Fretter | Jan. 25, 1921 |
| 1,976,104 | Archea | Oct. 9, 1934 |
| 1,983,453 | Hargraves | Dec. 4, 1934 |
| 2,134,743 | Strawn | Nov. 1, 1938 |
| 2,438,633 | Condor | Mar. 30, 1948 |